United States Patent
Liu et al.

(10) Patent No.: US 8,411,044 B2
(45) Date of Patent: Apr. 2, 2013

(54) TOUCH PANEL, METHOD FOR MAKING THE SAME, AND DISPLAY DEVICE ADOPTING THE SAME

(75) Inventors: Chang-Hong Liu, Beijing (CN); Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 674 days.

(21) Appl. No.: 12/286,151

(22) Filed: Sep. 29, 2008

(65) Prior Publication Data

US 2009/0153504 A1 Jun. 18, 2009

(30) Foreign Application Priority Data

Dec. 14, 2007 (CN) .......................... 2007 1 0125112

(51) Int. Cl.
*G06F 3/041* (2006.01)
(52) U.S. Cl. ........................................ 345/173; 428/221
(58) Field of Classification Search .................. None
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 5,931,764 A | 8/1999 | Freeman et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |
| 7,060,241 B2 | 6/2006 | Glatkowski | |

(Continued)

FOREIGN PATENT DOCUMENTS

| | | |
|---|---|---|
| CN | 2539375 | 3/2003 |
| CN | 1447279 | 10/2003 |

(Continued)

OTHER PUBLICATIONS

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

(Continued)

*Primary Examiner* — Andrew L Sniezek
(74) *Attorney, Agent, or Firm* — Altis Law Group, Inc.

(57) ABSTRACT

A touch panel includes a substrate, a transparent conductive layer, and at least two separate electrodes. The substrate includes a first surface. The transparent conductive layer is formed on the first surface of the substrate. The transparent conductive layer includes a carbon nanotube layer, and the carbon nanotube layer includes a plurality of carbon nanotubes entangled with each other. The electrodes are separately disposed on a surface of the transparent conductive layer and electrically connected with the transparent conductive layer. Further, a method for making the touch panel and a display device adopting the same are also included.

14 Claims, 5 Drawing Sheets

U.S. PATENT DOCUMENTS

| | | |
|---|---|---|
| 7,071,927 B2 | 7/2006 | Blanchard |
| 7,084,933 B2 | 8/2006 | Oh et al. |
| 7,196,463 B2 | 3/2007 | Okai et al. |
| 7,215,329 B2 | 5/2007 | Yoshikawa et al. |
| 7,242,136 B2 | 7/2007 | Kim et al. |
| 7,336,261 B2 | 2/2008 | Yu |
| 7,348,966 B2 | 3/2008 | Hong et al. |
| 7,355,592 B2 | 4/2008 | Hong et al. |
| 7,532,182 B2 | 5/2009 | Tseng et al. |
| 7,593,004 B2 | 9/2009 | Spath et al. |
| 7,630,040 B2 | 12/2009 | Liu et al. |
| 7,662,732 B2 | 2/2010 | Choi et al. |
| 7,663,607 B2 | 2/2010 | Hotelling et al. |
| 7,704,480 B2 | 4/2010 | Jiang et al. |
| 7,710,649 B2 | 5/2010 | Feng et al. |
| 7,796,123 B1 | 9/2010 | Irvin, Jr. et al. |
| 7,825,911 B2 | 11/2010 | Sano et al. |
| 7,854,992 B2 | 12/2010 | Fu et al. |
| 7,947,977 B2 | 5/2011 | Jiang et al. |
| 2002/0089492 A1 | 7/2002 | Ahn et al. |
| 2003/0122800 A1 | 7/2003 | Yu |
| 2003/0147041 A1 | 8/2003 | Oh et al. |
| 2003/0189235 A1 | 10/2003 | Watanabe et al. |
| 2004/0047038 A1 | 3/2004 | Jiang et al. |
| 2004/0053780 A1 | 3/2004 | Jiang et al. |
| 2004/0099438 A1 | 5/2004 | Arthur et al. |
| 2004/0105040 A1 | 6/2004 | Oh et al. |
| 2004/0136896 A1 | 7/2004 | Liu et al. |
| 2004/0191157 A1 | 9/2004 | Harutyunyan et al. |
| 2004/0251504 A1 | 12/2004 | Noda |
| 2005/0110720 A1 | 5/2005 | Akimoto et al. |
| 2005/0151195 A1 | 7/2005 | Kavase et al. |
| 2005/0209392 A1 | 9/2005 | Luo et al. |
| 2006/0010996 A1 | 1/2006 | Jordan et al. |
| 2006/0022221 A1 | 2/2006 | Furukawa et al. |
| 2006/0044284 A1 | 3/2006 | Tanabe |
| 2006/0061704 A1 | 3/2006 | Hayano et al. |
| 2006/0077147 A1 | 4/2006 | Palmateer et al. |
| 2006/0097991 A1 | 5/2006 | Hotelling et al. |
| 2006/0171032 A1 | 8/2006 | Nishioka |
| 2006/0187213 A1 | 8/2006 | Su |
| 2006/0187369 A1 | 8/2006 | Chang |
| 2006/0188721 A1 | 8/2006 | Irvin, Jr. et al. |
| 2006/0213251 A1 | 9/2006 | Rinzler et al. |
| 2006/0240605 A1 | 10/2006 | Moon et al. |
| 2006/0262055 A1 | 11/2006 | Takahara |
| 2006/0263588 A1 | 11/2006 | Handa et al. |
| 2006/0274047 A1 | 12/2006 | Spath et al. |
| 2006/0274048 A1 | 12/2006 | Spath et al. |
| 2006/0274049 A1 | 12/2006 | Spath et al. |
| 2006/0275956 A1 | 12/2006 | Konesky |
| 2006/0278444 A1 | 12/2006 | Binstead |
| 2007/0065651 A1 | 3/2007 | Glatkowski et al. |
| 2007/0075619 A1 | 4/2007 | Jiang et al. |
| 2007/0081681 A1 | 4/2007 | Yu et al. |
| 2007/0085838 A1 | 4/2007 | Ricks et al. |
| 2007/0099333 A1 | 5/2007 | Moriya |
| 2007/0165004 A1 | 7/2007 | Seelhammer et al. |
| 2007/0182720 A1 | 8/2007 | Fujii et al. |
| 2007/0215841 A1 | 9/2007 | Ford et al. |
| 2007/0257894 A1 | 11/2007 | Philipp |
| 2007/0262687 A1 | 11/2007 | Li |
| 2007/0279556 A1 | 12/2007 | Wang et al. |
| 2007/0296897 A1 | 12/2007 | Liu et al. |
| 2007/0298253 A1 | 12/2007 | Hata et al. |
| 2008/0007535 A1 | 1/2008 | Li |
| 2008/0029292 A1 | 2/2008 | Takayama et al. |
| 2008/0048996 A1 | 2/2008 | Hu et al. |
| 2008/0088219 A1 | 4/2008 | Yoon et al. |
| 2008/0095694 A1 | 4/2008 | Nakayama et al. |
| 2008/0129666 A1 | 6/2008 | Shimotono et al. |
| 2008/0138589 A1 | 6/2008 | Wakabayashi et al. |
| 2008/0192014 A1 | 8/2008 | Kent et al. |
| 2008/0238882 A1 | 10/2008 | Sivarajan et al. |
| 2008/0248235 A1 | 10/2008 | Feng et al. |
| 2008/0266273 A1 | 10/2008 | Slobodin et al. |
| 2009/0032777 A1 | 2/2009 | Kitano et al. |
| 2009/0056854 A1 | 3/2009 | Oh et al. |
| 2009/0059151 A1 | 3/2009 | Kim et al. |
| 2009/0101488 A1 | 4/2009 | Jiang et al. |
| 2009/0153511 A1 | 6/2009 | Jiang et al. |
| 2009/0153513 A1 | 6/2009 | Liu et al. |
| 2009/0153514 A1 | 6/2009 | Jiang et al. |
| 2009/0153516 A1 | 6/2009 | Liu et al. |
| 2009/0167709 A1 | 7/2009 | Jiang et al. |
| 2009/0208708 A1 | 8/2009 | Wei et al. |
| 2009/0224422 A1* | 9/2009 | Dubin .......................... 264/259 |
| 2009/0283211 A1 | 11/2009 | Matsuhira |
| 2009/0293631 A1 | 12/2009 | Radivojevic |
| 2009/0322705 A1* | 12/2009 | Halsey, IV .................... 345/174 |
| 2010/0001972 A1 | 1/2010 | Jiang et al. |
| 2010/0001975 A1 | 1/2010 | Jiang et al. |
| 2010/0001976 A1 | 1/2010 | Jiang et al. |
| 2010/0007619 A1 | 1/2010 | Jiang et al. |
| 2010/0007624 A1 | 1/2010 | Jiang et al. |
| 2010/0007625 A1 | 1/2010 | Jiang et al. |
| 2010/0065788 A1 | 3/2010 | Momose et al. |
| 2010/0078067 A1 | 4/2010 | Jiang et al. |
| 2010/0093247 A1 | 4/2010 | Jiang et al. |
| 2010/0171099 A1 | 7/2010 | Tombler, Jr. et al. |
| 2010/0271330 A1 | 10/2010 | Philipp |
| 2011/0032196 A1 | 2/2011 | Feng et al. |
| 2011/0201764 A1* | 8/2011 | Armeniades et al. ......... 525/523 |
| 2012/0105371 A1 | 5/2012 | Hotelling et al. |

FOREIGN PATENT DOCUMENTS

| | | |
|---|---|---|
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 2706973 | 6/2005 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| CN | 101239712 | 8/2008 |
| CN | 101248411 | 8/2008 |
| DE | 202007006407 | 9/2007 |
| EP | 1739692 | 1/2007 |
| JP | S61-231626 | 10/1986 |
| JP | 61-283918 | 12/1986 |
| JP | S62-63332 | 3/1987 |
| JP | 62-139028 | 6/1987 |
| JP | S62-182916 | 8/1987 |
| JP | S62-190524 | 8/1987 |
| JP | 1-214919 | 8/1989 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 1995-28598 | 1/1995 |

| | | |
|---|---|---|
| JP | 8-287775 | 11/1996 |
| JP | H10-63404 | 3/1998 |
| JP | 10-246605 | 9/1998 |
| JP | 2001-34419 | 2/2001 |
| JP | 2001-267782 | 9/2001 |
| JP | 2002519754 | 7/2002 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2006-330883 | 12/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | I287669 | 10/2007 |
| TW | 200926471 | 6/2009 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).
Yoshikazu Nakayama, "Technology Development of CNT Long Yarns and CNT Sheets", Nano Carbon Handbook, Japan TSN INC, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).
Mei Zhang etal., "Strong Transparent, Multifunctional, Carbon Nanotube Sheets", Science, America, AAAS, Vol. 309, pp. 1215-1219, Aug. 19, 2005.
George Gruner, "Carbon Nanonets Spark New Electronics", Scientific American, pp. 76-83, May 2007.
Yu Xiang, Technique of Touch Panel & the Production of Resistance-type Touch Panel Insulation Dot, Journal of Longyan Teachers College, p. 25-26, vol. 22, No. 6, 2004.
Fan et al. "Self-Oriented Regular Arrays of Carbon Nanotubes and Their Field Emission Properties". Science, vol. 283, (1999); pp. 512-514.
ASM Handbook."Volume 2 Properties and Selection: Nonferrous Alloys and Special-Purpose Materials".Apr. 2007; pp. 840-853.
Susuki et al."Investigation of physical and electric properties of silver pastes as binder for thermoelectric materials". Review of Scientific Instruments,76,(2005);pp. 023907-1 to 023907-5.
Wu et al."Transparent, Conductive Carbon Nanotube Films". Science,vol. 305,(2004);pp. 1273-1276.
Kai-Li Jiang, Qun-Qing Li, Shou-Shan Fan, "Continuous carbon nanotube yarns and their applications", Physics, China, pp. 506-510,Aug. 31, 2003,32(8)(lines from the 4th line to 35th line in the right column of p. 507 may be relevant).
R Colin Johnson, "Carbon nanotubes aim for cheap, durable touch screens",Aug. 2007 http://psroc.phys.ntu.edu.tw/bimonth/v27/615.pdf.
Xianglin Liu, "strong, transparent, multifunctional carbon nanotube sheets", pp. 720~721, Oct. 2005 http://www.eettaiwan.com/articleLogin.do?artId=8800474428&fromWhere=/ART_8800474428_480502_NT_95e7014f.HTM&catId=480502&newsType=NT&pageNo=null&encode=95e7014f.

* cited by examiner (a) providing a raw material of carbon nanotubes and a substrate

(b) flocculating the raw material of carbon nanotubes to acquire a carbon nanotube floccule structure, treating the carbon nanotube floccule structure so as to obtain a carbon nanotube layer, and attaching the carbon nanotube layer on a surface of the substrate

(c) providing at least two electrodes, and separately electrically connecting the electrodes with the carbon nanotube layer, thereby forming a subassembly of the touch panel

FIG. 3

TOUCH PANEL, METHOD FOR MAKING THE SAME, AND DISPLAY DEVICE ADOPTING THE SAME

RELATED APPLICATIONS

This application is related to commonly-assigned application Ser. No. 12/286,266, entitled, "TOUCH PANEL", filed on Sep. 29, 2008; Ser. No. 12/286,181, entitled, "TOUCH PANEL AND DISPLAY DEVICE USING THE SAME", filed on Sep. 29, 2008; Ser. No. 12/286,154, entitled, "TOUCH PANEL AND DISPLAY DEVICE USING THE SAME", filed on Sep. 29, 2008; Ser. No. 12/286,189, entitled, "TOUCH PANEL AND DISPLAY DEVICE USING THE SAME", filed on Sep. 29, 2008; Ser. No. 12/286,176, entitled, "TOUCH PANEL AND DISPLAY DEVICE USING THE SAME", filed on Sep. 29, 2008; Ser. No. 12/286,143, entitled, "ELECTRONIC ELEMENT HAVING CARBON NANOTUBES", filed on Sep. 29, 2008; Ser. No. 12/286,166, entitled, "TOUCH PANEL AND DISPLAY DEVICE USING THE SAME", filed on Sep. 29, 2008; Ser. No. 12/286,178, entitled, "TOUCH PANEL AND DISPLAY DEVICE USING THE SAME", filed on Sep. 29, 2008; Ser. No. 12/286,148, entitled, "TOUCH PANEL AND DISPLAY DEVICE USING THE SAME", filed on Sep. 29, 2008; Ser. No. 12/286,140, entitled, "TOUCHABLE CONTROL DEVICE", filed on Sep. 29, 2008; Ser. No. 12/286,146, entitled, "TOUCH PANEL AND DISPLAY DEVICE USING THE SAME", filed on Sep. 29, 2008; Ser. No. 12/286,216, entitled, "TOUCH PANEL AND DISPLAY DEVICE USING THE SAME", filed on Sep. 29, 2008; Ser. No. 12/286,152, entitled, "TOUCH PANEL AND DISPLAY DEVICE USING THE SAME", filed on Sep. 29, 2008; Ser. No. 12/286,145, entitled, "TOUCH PANEL AND DISPLAY DEVICE USING THE SAME", filed on Sep. 29, 2008; Ser. No. 12/286,155, entitled, "TOUCH PANEL, METHOD FOR MAKING THE SAME, AND DISPLAY DEVICE ADOPTING THE SAME", filed on Sep. 29, 2008; Ser. No. 12/286,179, entitled, "TOUCH PANEL AND DISPLAY DEVICE USING THE SAME", filed on Sep. 29, 2008; Ser. No. 12/286,228, entitled, "TOUCH PANEL, METHOD FOR MAKING THE SAME, AND DISPLAY DEVICE ADOPTING THE SAME", filed on Sep. 29, 2008; Ser. No. 12/286,153, entitled, "TOUCH PANEL AND DISPLAY DEVICE USING THE SAME", filed; Ser. No. 12/286,184, entitled, "TOUCH PANEL AND DISPLAY DEVICE USING THE SAME", filed on Sep. 29, 2008; Ser. No. 12/286,175, entitled, "METHOD FOR MAKING TOUCH PANEL", filed on Sep. 29, 2008; Ser. No. 12/286,195, entitled, "METHOD FOR MAKING TOUCH PANEL", filed on Sep. 29, 2008; Ser. No. 12/286,160, entitled, "TOUCH PANEL AND DISPLAY DEVICE USING THE SAME", filed on Sep. 29, 2008; Ser. No. 12/286,220, entitled, "TOUCH PANEL AND DISPLAY DEVICE USING THE SAME", filed on Sep. 29, 2008; Ser. No. 12/286,227, entitled, "TOUCH PANEL AND DISPLAY DEVICE USING THE SAME", filed on Sep. 29, 2008; Ser. No. 12/286,144, entitled, "TOUCH PANEL AND DISPLAY DEVICE USING THE SAME", filed on Sep. 29, 2008; Ser. No. 12/286,218, entitled, "TOUCH PANEL AND DISPLAY DEVICE USING THE SAME", filed on Sep. 29, 2008; Ser. No. 12/286,142, entitled, "TOUCH PANEL AND DISPLAY DEVICE USING THE SAME", filed on Sep. 29, 2008; Ser. No. 12/286,241, entitled, "TOUCH PANEL AND DISPLAY DEVICE USING THE SAME", filed on Sep. 29, 2008; Ser. No. 12/286,141, entitled, "TOUCH PANEL", filed on Sep. 29, 2008; and Ser. No. 12/286,219, entitled, "TOUCH PANEL, METHOD FOR MAKING THE SAME, AND DISPLAY DEVICE ADOPTING THE SAME", filed on Sep. 29, 2008. The disclosures of the above-identified applications are incorporated herein by reference.

BACKGROUND

1. Field of the Invention

The present invention relates to touch panels, methods for making the same and display devices adopting the same and, particularly, to a carbon-nanotube-based touch panel, a method for making the same, and a display device adopting the same.

2. Discussion of Related Art

Following the advancement in recent years of various electronic apparatuses, such as mobile phones, car navigation systems and the like toward high performance and diversification, there has been continuous growth in the number of electronic apparatuses equipped with optically transparent touch panels in front of their respective display devices (e.g., a display such as a liquid crystal panel). A user of any such electronic apparatus operates it by pressing or touching the touch panel with a finger, a pen, a stylus, or a like tool while visually observing the display device through the touch panel. A demand thus exists for such touch panels that are superior in visibility and reliable in operation.

At present, different types of touch panels, including a resistance-type, a capacitance-type, an infrared-type, and a surface sound wave-type, have been developed. The capacitance-type touch panel has advantages such as higher accuracy and excellent transparency, and thus has been widely used.

A conventional capacitance-type touch panel includes a glass substrate, a transparent conductive layer, and four electrodes. The material of the transparent conductive layer is selected from a group consisting of indium tin oxide (ITO) and antimony tin oxide (ATO). The electrodes are made of metal and separately formed on a surface of the transparent conductive layer. Further, a transparent protective film is formed on the surface of the transparent conductive layer that faces away from the substrate. The material of the transparent protective film has insulative and transparent characteristics.

In operation, an upper surface of the touch panel is pressed/touched with a touch tool, such as a user's finger or an electrical pen/stylus. Concordantly, visual observation of a screen on the liquid crystal display device provided on a back side of the touch panel is allowed. In use, due to an electrical field of the user, a coupling capacitance forms between the user and the transparent conductive layer. For high frequency electrical current, the coupled capacitance is a conductor, and thus the touch tool takes away a little current from the touch point. Current flowing through the four electrodes cooperatively replaces the current lost at the touch point. The quantity of current supplied by the four electrodes is directly proportional to the distances from the touch point to the electrodes. A touch panel controller is used to calculate the proportion of the four supplied currents, thereby detecting coordinates of the touch point on the touch panel.

However, the optically transparent conductive layer (e.g., ITO layer) is generally formed by means of ion-beam sputtering, and this method is relatively complicated. Furthermore, the ITO layer has generally poor mechanical durability, low chemical endurance and uneven resistance over an entire area of the touch panel. Additionally, the ITO layer has relatively low transparency. All the above-mentioned problems of the ITO layer tend to yield a touch panel with low sensitivity, accuracy, and brightness.

What is needed, therefore, is to provide a durable touch panel with high sensitivity, accuracy, and brightness, a method for making the same, and a display device adopting the same.

SUMMARY

A touch panel includes a substrate, a transparent conductive layer, and at least two separate electrodes. The substrate includes a first surface. The transparent conductive layer is formed on the first surface of the substrate. The transparent conductive layer includes a carbon nanotube layer, and the carbon nanotube layer includes a plurality of carbon nanotubes entangled with each other. The electrodes are separately disposed a surface of the transparent conductive layer and are electrically connected with the transparent conductive layer. Further, a method for making the same, and a display device adopting the same are also included.

Other advantages and novel features of the present touch panel, method for making the same, and display device adopting the same will become more apparent from the following detailed description of the present embodiments when taken in conjunction with the accompanying drawings.

BRIEF DESCRIPTION OF THE DRAWINGS

Many aspects of the present touch panel, method for making the same, and display device adopting the same can be better understood with reference to the following drawings. The components in the drawings are not necessarily to scale, the emphasis instead being placed upon clearly illustrating the principles of the present touch panel, method for making the same, and display device adopting the same.

FIG. 3 is a flow chart of an exemplary method for making the touch panel of FIG. 1.

Figure 1:
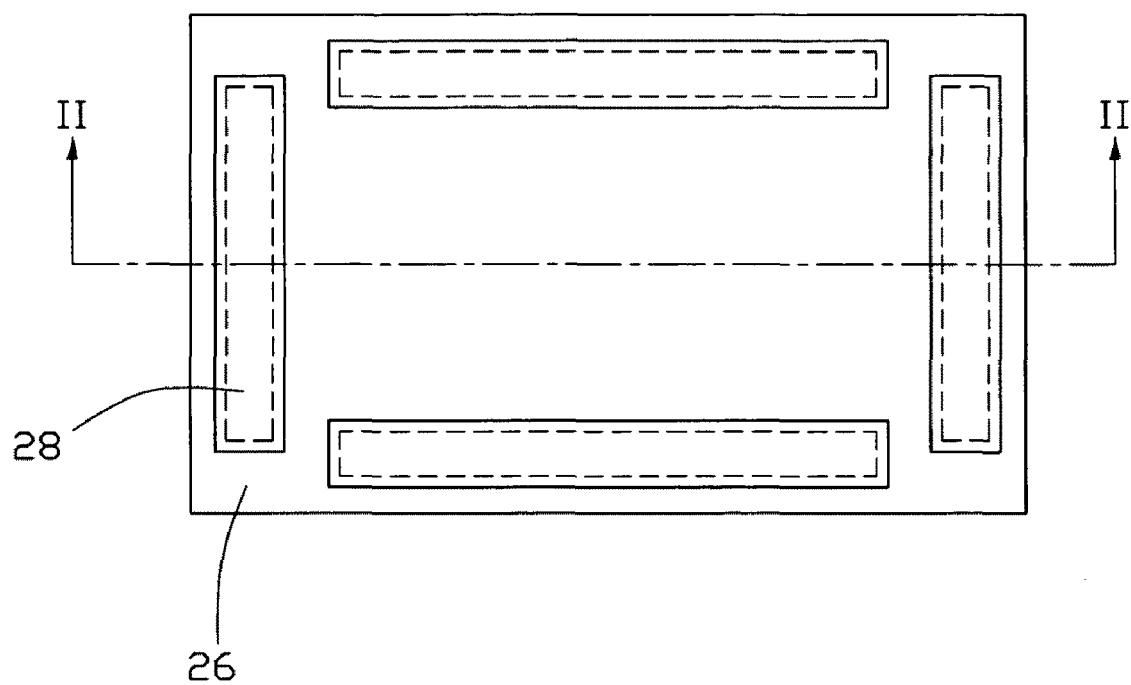
FIG. 1 is a schematic view of a partially assembled touch panel, in accordance with a present embodiment.

Corresponding reference characters indicate corresponding parts throughout the several views. The exemplifications set out herein illustrate at least one embodiment of the present touch panel, method for making the same, and display device adopting the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present touch panel, method for making the same, and display device adopting the same.

Figure 2:
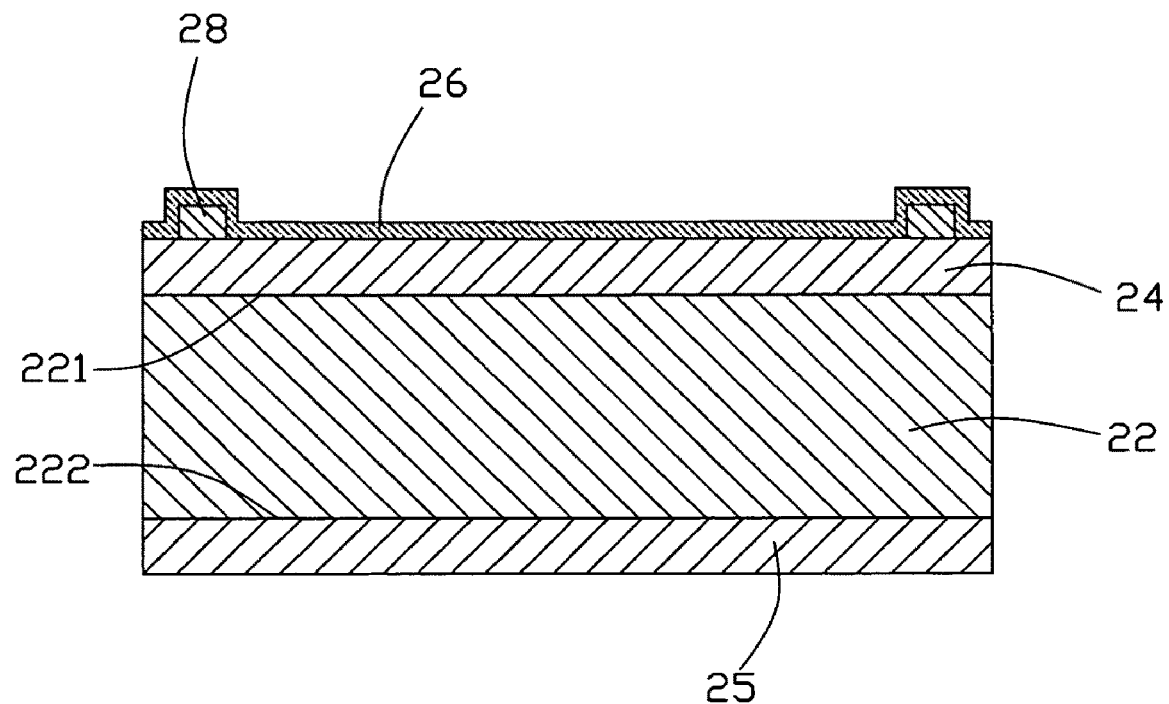
FIG. 2 is a cross-sectional schematic view of the touch panel of FIG. 1, taken along a line II-II of FIG. 1.

Referring to FIG. 1 and FIG. 2, a touch panel 20 includes a substrate 22, a transparent conductive layer 24, a transparent protective film 26, and at least two electrodes 28. The substrate 22 has a first surface 221 and a second surface 222 at opposite sides thereof respectively. The transparent conductive layer 24 is disposed on the first surface 221. The electrodes 28 are separately disposed adjacent sides of the transparent conductive layer 24 and electrically connected with the transparent conductive layer 24 for forming an equipotential surface on the transparent conductive layer 24. The transparent protective film 26 covers the electrodes 28 and the exposed surface of the transparent conductive layer 24 that faces away from the substrate 22.

The substrate 22 has a planar structure or a curved structure. The material of the substrate 22 can be selected from the group consisting of glass, quartz, diamond, and plastics. Understandably, the substrate 22 can be made from a transparent material, e.g., either flexible or hard/stiff, depending on whether a flexible device is desired or not. The substrate 22 is used to support the transparent conductive layer 24.

The transparent conductive layer 24 includes a carbon nanotube layer. The carbon nanotube layer includes a plurality of carbon nanotubes entangled with each other. The adjacent carbon nanotubes are combined and entangled by van der Waals attractive force therebetween, thereby forming an entangled, microporous structure. Further, the carbon nanotubes in the carbon nanotube layer are substantially uniform. It is understood that the carbon nanotube layer is typically very microporous. Sizes of the micropores are less than 10 micrometers. A length and a width of the carbon nanotube layer can be arbitrarily set, as desired. Due to the carbon nanotube layer having good tensile strength, it can be formed into almost any desired shape. As such, the carbon nanotube layer can have a planar or curved structure. The carbon nanotubes in the carbon nanotube layer can be selected from a group consisting of single-walled carbon nanotubes, double-walled carbon nanotubes, and multi-walled carbon nanotubes. A diameter of each single-walled carbon nanotube is in an approximate range from 0.5 nanometers to 50 nanometers. A diameter of each double-walled carbon nanotube is in an approximate range from 1 nanometer to 50 nanometers. A diameter of each multi-walled carbon nanotube is in an approximate range from 1.5 nanometers to 50 nanometers.

Due to the carbon nanotube layer including a plurality of substantially uniform carbon nanotubes and the micropores, the carbon nanotube layer has excellent resistance distribution and light transparence. Thus the touch panel 20 has good accuracy, and the display device adopting the touch panel 20 has good accuracy and brightness.

It is to be noted that the shape of the substrate 22 and the transparent conductive layer 24 is chosen according to the requirements of the touch field of the touch panel 20. Generally, the shape of the touch field may be triangular or rectangular. In the present embodiment, the shapes of the touch field, the substrate 22, and the transparent conductive layer 24 are all rectangular.

Due to the transparent conductive layer 24 being rectangular, four electrodes 28 are needed and are formed on the surface of the transparent conductive layer 24, thereby obtaining an equipotential surface. Specifically, the substrate 22 is a glass substrate. The electrodes 28 are strip-shaped, and can be formed by metallic layers, conductive resin layers, carbon nanotube films or any other suitable materials. The electrodes 28 can be disposed directly on a surface of the transparent conductive layer 24 that faces away from the substrate 22. The electrodes 28 are, beneficially, formed by one or more of spraying, electrical deposition, and electroless deposition methods. Moreover, the electrodes 28 can also be adhered to the surface of the transparent conductive layer 24, e.g., by a silver-based slurry.

Further, in order to prolong operational life span and restrict coupling capacitance of the touch panel 20, the transparent protective film 26 is disposed on the electrodes 28 and the transparent conductive layer 24. The material of the transparent protective film 26 can, e.g., be selected from a group consisting of silicon nitride, silicon dioxide, benzocyclobutenes, polyester film, and polyethylene terephthalate. The transparent protective film 26 can be a plastic film and receives a surface hardening treatment to protect the electrodes 28 and the transparent conductive layer 24 from being scratched when in use.

In the present embodiment, the transparent protective film 26 is silicon dioxide. The hardness and thickness of the transparent protective film 26 are selected according to practical needs. The transparent protective film 26 is adhered to the transparent conductive layer 24, e.g., via an adhesive.

The touch panel 20 can further include a shielding layer 25 disposed on the second surface 222 of the substrate 22. The material of the shielding layer 25 can be indium tin oxide, antimony tin oxide, carbon nanotubes, and/or another conductive material. In the present embodiment, the shielding layer 25 is a carbon nanotube layer. The carbon nanotube layer includes a plurality of carbon nanotubes, and the orientation of the carbon nanotubes therein may be arbitrarily determined. The carbon nanotubes in the carbon nanotube layer can be arranged along a same direction. The carbon nanotube layer is connected to ground and acts as a shield, thus enabling the touch panel 20 to operate without interference (such as electromagnetic interference).

Referring to FIG. 3, an exemplary method for making the above-described touch panel 20 includes the steps of: (a) providing a raw material of carbon nanotubes and a substrate 22; (b) flocculating the raw material of carbon nanotubes to acquire a carbon nanotube floccule structure, treating the carbon nanotube floccule structure so as to obtain a carbon nanotube layer, and attaching the carbon nanotube layer on a surface of the substrate 22; and (c) providing at least two electrodes, and separately electrically connecting the electrodes with the carbon nanotube layer, thereby forming a subassembly of the touch panel 20.

In step (a), the raw material of carbon nanotubes is an array of carbon nanotubes. The given super-aligned array of carbon nanotubes can be formed by the steps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; (a5) supplying a carbon source gas to the furnace for about 5 to 30 minutes and growing a super-aligned array of carbon nanotubes on the substrate; and (a6) separating the array of carbon nanotubes from the substrate to obtain the raw material of carbon nanotubes.

In step (a1), the substrate can be a P-type silicon wafer, an N-type silicon wafer, or a silicon wafer with a film of silicon dioxide thereon. A 4-inch P-type silicon wafer is used as the substrate in the present embodiment.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height above 50 microns to 5 millimeters and include a plurality of carbon nanotubes parallel to each other and approximately perpendicular to the substrate. That is, the length of each carbon nanotube is above 10 micrometers, therefore portions of the carbon nanotubes are bundled together. Moreover, the super-aligned array of carbon nanotubes formed under the above conditions is essentially free of impurities such as carbonaceous or residual catalyst particles. The carbon nanotubes in the super-aligned array are closely packed together by van der Waals attractive force.

In step (a6), the array of carbon nanotubes is scraped from the substrate by using a knife or another suitable device to obtain the raw material of carbon nanotubes. Such a raw material is, to a certain degree, able to maintain the bundled state of the carbon nanotubes. The lengths of the carbon nanotubes in the raw material are above 10 micrometers.

Further, the substrate 22 is rectangular, and has the first surface 221 and the second surface 222 at opposite sides thereof respectively. The substrate 22 is made of glass.

In step (b), the flocculating process includes the substeps of: (b1) adding the raw material of carbon nanotubes to a solvent to obtain a floccule structure of carbon nanotubes; (b2) pump filtrating the floccule structure to obtain a carbon nanotube layer; and (b3) attaching the carbon nanotube layer on the surface of the substrate 22.

In step (b1), the solvent is selected from the group consisting of water and a volatile organic solvent. After adding the raw material of carbon nanotubes to the solvent, a process of flocculating is executed to obtain the floccule structure. The process of flocculating is selected from the group consisting of ultrasonic dispersion and high-strength agitating/vibrating. In this embodiment, ultrasonic dispersion is used to flocculate the solvent containing the carbon nanotubes for about 10-30 minutes. Due to the carbon nanotubes in the solvent having a large specific surface area and the bundled carbon nanotubes having large van der Waals attractive force, the flocculated and bundled carbon nanotubes form an entangled structure (i.e., the floccule structure).

In step (b2), the process of pump filtration includes the substeps of: (b21) providing a microporous membrane and an air-pumping funnel; (b22) filtering the solvent containing the floccule structure of carbon nanotubes through the microporous membrane into the air-pumping funnel; and (b23) air-pumping and drying the floccule structure of carbon nanotubes captured on the microporous membrane to thereby obtain the carbon nanotube layer.

In step (b21), the microporous membrane has a smooth surface. The diameters of micropores in the microporous membrane are about 0.22 micrometers. The pump filtration can exert air pressure on the floccule structure, thus forming a uniform carbon nanotube layer. Moreover, due to the microporous membrane having a smooth surface, the carbon nanotube layer can be easily separated from the microporous membrane.

In step (c), the carbon nanotube layer is cut into a predetermined shape, and is directly attached on the first surface 221 of the substrate 22.

In an alternative embodiment, step (b) can instead be accomplished by a step (b'). Step (b') includes the substeps of: (b1') adding the raw material of carbon nanotubes to a solvent to obtain a floccule structure of carbon nanotubes; (b2') separating the carbon nanotube floccule structure from the solvent; and (b3') shaping the separated carbon nanotube floccule structure into the carbon nanotube layer.

In step (b2'), the process of separating the floccule structure from the solvent includes the substeps of: (b21') pouring the solvent containing the floccule structure through a filter into a funnel; and (b22') drying the floccule structure on the filter to obtain the separated floccule structure of carbon nanotubes.

In step (b22'), a time of drying can be selected according to practical needs. The floccule structure of carbon nanotubes on the filter is bundled together, in the form of an irregular flocculate structure.

In step (b3'), the process of shaping the separated carbon nanotube floccule structure into the carbon nanotube layer includes the substeps of: (b31') putting the separated floccule structure into a container (not shown), and spreading the floccule structure to form a spread floccule structure; (b32') pressing the spread floccule structure with a certain pressure to yield a desired shape; and (b33') drying the spread floccule structure to remove the residual solvent, or volatilizing the residual solvent, to form the carbon nanotube layer.

It is to be understood that the size of the spread floccule structure can used to control a thickness and a surface density of the carbon nanotube layer. As such, the greater the area that a given amount of the floccule structure is spread over, the less the thickness and the density of the carbon nanotube layer.

Figure 4:
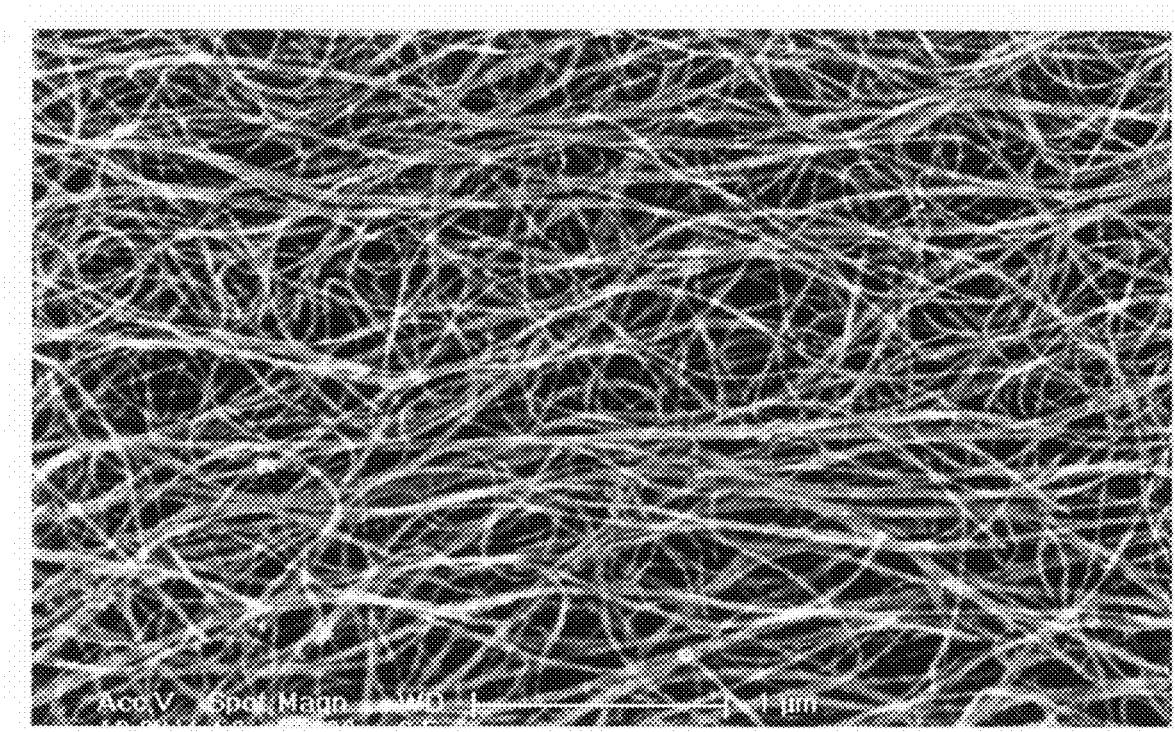
FIG. 4 shows a Scanning Electron Microscope (SEM) image of a carbon nanotube layer used in the touch panel of FIG. 1.

Referring to FIG. 4, the carbon nanotube layer includes a plurality of carbon nanotubes entangled with each other, with the carbon nanotubes being substantially uniform. The adjacent carbon nanotubes are combined and entangled by van der Waals attractive force, thereby forming the entangled, microporous structure. The carbon nanotube layer includes a plurality of micropores. The sizes of the micropores are less than 10 micrometers. Thereby, the carbon nanotube layer has good strength. Also, because of the flexibility of the carbon nanotube layer, the carbon nanotube layer can easily be folded or bent into arbitrary shapes without rupture.

The carbon nanotube layer produced by any of the above-described methods has at least the following advantages. Firstly, through flocculating, the carbon nanotubes are bundled together by van der Waals attractive force to form an entangled, floccule structure. Thus, the carbon nanotube layer is very durable. Secondly, the carbon nanotube layer can be very simply and efficiently produced according to any of the above-described methods. A result of the production process of any of the above-described methods is that the thickness and surface density of the carbon nanotube layer are controllable.

Unlike previous methods for making an ITO film, the above-described methods do not require a vacuum environment and heat processing. Thus the carbon nanotube layer formed by a flocculating method and used as the transparent conductive layer 24 has the advantage of being low cost, environmentally safe, and energy efficient.

Figure 5:
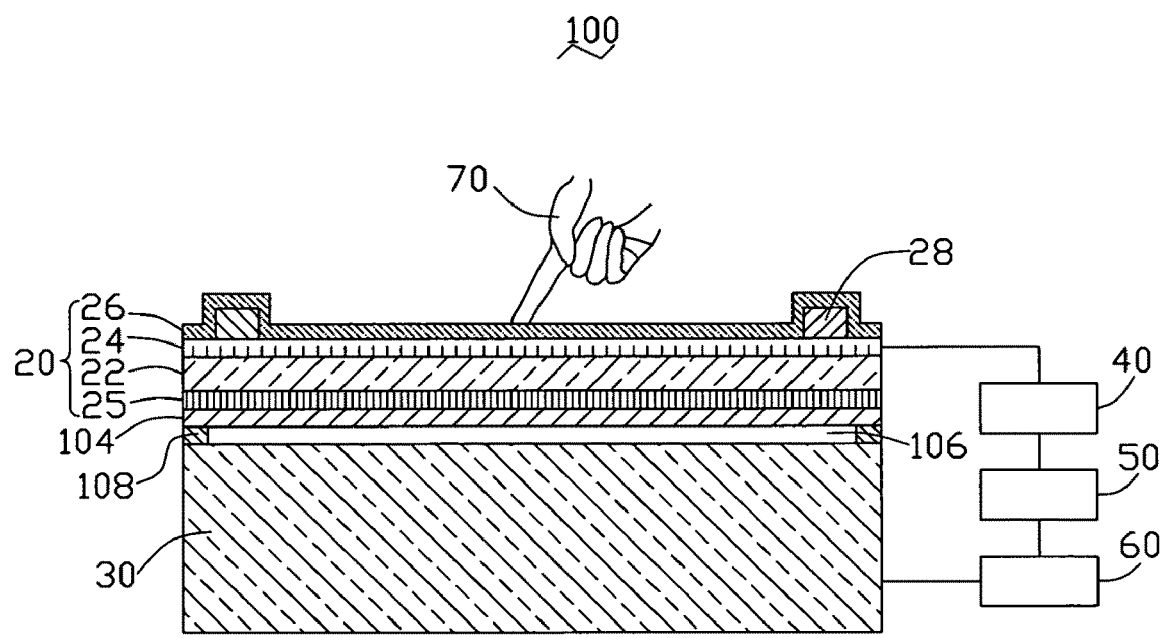
FIG. 5 is a schematic assembled cross-sectional view of the touch panel of the present embodiment used with a display element of a display device.

Referring to FIG. 5, a display device 100 includes the touch panel 20, a display element 30, a touch panel controller 40, a central processing unit (CPU) 50, and a display element controller 60. The touch panel 20 is connected to the touch panel controller 40 by an external circuit. The touch panel 20 can be spaced from the display element 30 by an intervening gap 106 or, alternatively, can be installed directly on the display element 30. The touch panel controller 40, the CPU 50, and the display element controller 60 are electrically connected. The CPU 50 is connected to the display element controller 60 to control the display element 30.

The display element 30 can be, e.g., a liquid crystal display, field emission display, plasma display, electroluminescent display, vacuum fluorescent display, cathode ray tube, or other display device.

When the shielding layer 25 is disposed on the second surface 222 of the substrate 22, a passivation layer 104 is disposed on and in contact with a surface of the shielding layer 25 that faces away from the substrate 22. The material of the passivation layer 104 can, beneficially, be silicon nitride or silicon dioxide. The passivation layer 104 can be spaced at a distance from the display element 30 or instead can be directly installed on the display element 30. When the passivation layer 104 is spaced at a distance from the display element 30, understandably, two or more spacers 108 can be used. Thereby, the gap 106 is provided between the passivation layer 104 and the display element 30. The passivation layer 104 protect the shielding layer 25 from chemical damage (e.g., humidity of the surrounding) or mechanical damage (e.g., scratching during fabrication of the touch panel).

In operation, a voltage is applied to the electrodes 28. A user operates the display device 100 by pressing or touching the transparent protective film 26 of the touch panel 20 with a touch tool, such as a finger or an electrical pen/stylus 70, while visually observing the display element 30 through the touch panel 20. In the illustration, the touch tool is the user's finger 70. Due to an electrical field of the user, a coupling capacitance forms between the user and the transparent conductive layer 24. For high frequency electrical current, the coupling capacitance is a conductor, and thus the touch tool 70 takes away a little current from the touch point. Currents flowing through the four electrodes 28 cooperatively replace the current lost at the touch point. The quantity of current supplied by each electrode 28 is directly proportional to the distances from the touch point to the electrodes 28. The touch panel controller 40 is used to calculate the proportion of the four supplied currents, thereby detecting coordinates of the touch point on the touch panel 20. Then, the touch panel controller 40 sends the coordinates of the touch point to the CPU 50. The CPU 50 receives and processes the coordinates into a command. Finally, the CPU 50 sends out the command to the display element controller 60. The display element controller 60 controls the display of the display element 30 accordingly.

The carbon nanotube layer provided in the present embodiments has superior properties, such as excellent toughness, high mechanical strength, and uniform conductivity. Thus, the touch panel 20 and the display device 100 using the same are durable and highly conductive. Further, the flocculating method for fabricating the carbon nanotube layer is simple, and the adhesive carbon nanotube layer can be disposed directly on the substrate 22. As such, the exemplary method for fabricating the carbon nanotube layer is suitable for the mass production of touch panels and display devices using the same and reduces the costs thereof. Further, the carbon nanotube layer has a microporous structure having a plurality of micropores whose diameters are less than 10 micrometers. Thus the carbon nanotube layer has high transparency. Thereby, the touch panel has improved transparency, and the display device using the touch panel has improved transparency and brightness.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A touch panel comprising:
   a substrate comprising a first surface;
   a transparent conductive layer disposed on the first surface of the substrate, the transparent conductive layer comprising a carbon nanotube layer, the carbon nanotube layer consists of a plurality of carbon nanotubes entangled with each other, the plurality of carbon nanotubes are unfunctionalized; and
   at least two electrodes disposed on a surface of the transparent conductive layer and electrically connected with the transparent conductive layer.

2. The touch panel as claimed in claim 1, wherein the plurality of carbon nanotubes in the carbon nanotube layer are substantially uniform, and lengths of the plurality of carbon nanotubes are greater than 10 micrometers.

3. The touch panel as claimed in claim 2, wherein the adjacent carbon nanotubes in the plurality of carbon nanotubes are combined and entangled by van der Waals attractive force therebetween and form an entangled microporous structure.

4. The touch panel as claimed in claim 3, wherein the entangled microporous structure comprises a plurality of micropores, and diameters of the plurality of micropores are less than 10 micrometers.

5. The touch panel as claimed in claim 1, wherein the plurality of carbon nanotubes in the carbon nanotube layer are selected from the group consisting of single-walled carbon nanotubes, double-walled carbon nanotubes, and multi-walled carbon nanotubes, diameters of the single-walled carbon nanotubes are in an approximate range from 0.5 nanometers to 50 nanometers, diameters of the double-walled carbon nanotubes are in an approximate range from 1 nanometer to 50 nanometers, and diameters of the multi-walled carbon nanotubes are in an approximate range from 1.5 nanometers to 50 nanometers.

6. The touch panel as claimed in claim 1, wherein the at least two electrodes are separately disposed on the surface of the transparent conductive layer facing away from the substrate, and the at least two electrodes are metal electrodes.

7. The touch panel as claimed in claim 6, wherein the at least two electrodes are adhered to the transparent conductive layer using a silver-based slurry.

8. The touch panel as claimed in claim 1, further comprising a transparent protective film disposed on the surface of the transparent conductive layer, wherein a material of the transparent protective film is selected from the group consisting of silicon nitride, silicon dioxide, benzocyclobutenes, polyester film, and polyethylene terephthalate.

9. The touch panel as claimed in claim 1, further comprising a shielding layer disposed on a second surface of the substrate that faces away from the transparent conductive layer, wherein a material of the shielding layer is selected from the group consisting of indium tin oxide, antimony tin oxide, and carbon nanotubes.

10. A display device comprising:
a touch panel comprising:
a substrate, comprising a first surface;
a transparent conductive layer disposed on the first surface of the substrate, the transparent conductive layer comprising a carbon nanotube layer, the carbon nanotube layer consists of a plurality of carbon nanotubes entangled with each other, the plurality of carbon nanotubes are unfunctionalized; and
at least two electrodes disposed on a surface of the transparent conductive layer, and electrically connected with the transparent conductive layer; and
a display element positioned opposite and adjacent to the touch panel.

11. The display device as claimed in claim 10, further comprising a touch panel controller, a central processing unit, and a display element controller electrically connected with each other, the touch panel controller being connected to the touch panel, and the display element controller being connected to the display element.

12. The display device as claimed in claim 10, wherein the display element is selected from the group consisting of liquid crystal displays, field emission displays, plasma displays, electroluminescent displays, vacuum fluorescent displays, and cathode ray tubes.

13. The display device as claimed in claim 10, wherein the touch panel is one of spaced at a distance from the display element and installed on the display element.

14. The display device as claimed in claim 10, further comprising a passivation layer disposed on a surface of the touch panel, the passivation layer positioned opposite and adjacent to the display element, and the passivation layer being comprised of one of silicon nitride and silicon dioxide.

* * * * *